Jan. 12, 1965 S. C. MAREK 3,164,873
SPRING CLIP FASTENER
Filed May 28, 1963
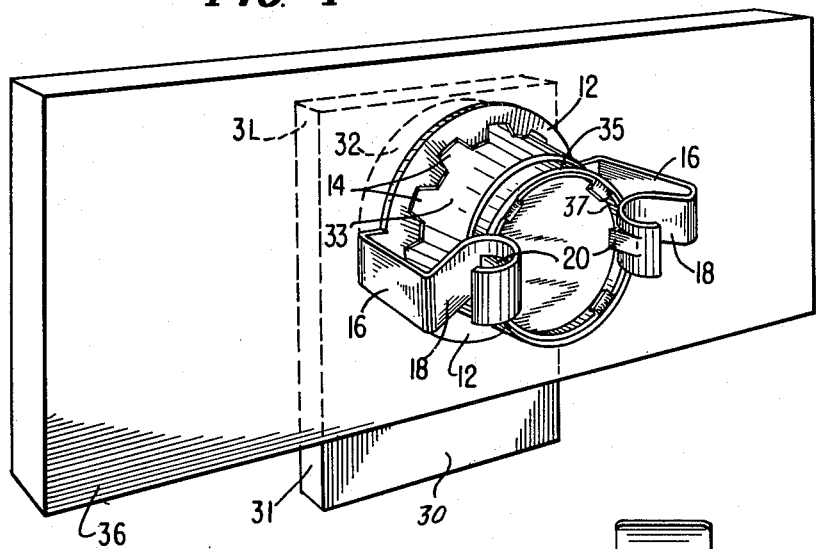
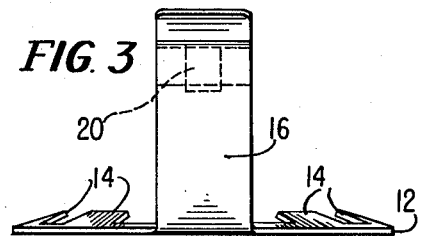
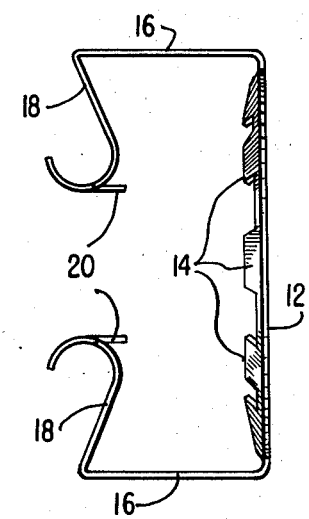
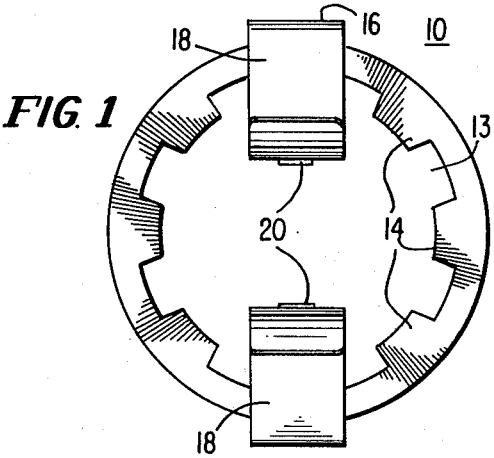
INVENTOR.
STANLEY C. MAREK
BY *James T. Baer*
ATTY.

United States Patent Office 3,164,873
Patented Jan. 12, 1965

3,164,873
SPRING CLIP FASTENER
Stanley C. Marek, Chicago, Ill., assignor to Admiral Corporation, Chicago, Ill., a corporation of Delaware
Filed May 28, 1963, Ser. No. 283,816
1 Claim. (Cl. 24—81)

This invention relates, in general, to spring clip fasteners. More specifically it relates to one-piece spring clip fasteners which function to secure one object within another object and, in addition, to secure themselves to the latter object.

A specific use of this invention is in securing the microphone for the remote control unit of a television receiver within a hollow tubular structure which is formed as an integral part of the television receiver cabinet. In this particular application, the spring clip fastener secures itself to the hollow tubular structure and also secures the microphone within the same.

In a preferred embodiment, the spring clip fastener is used to secure the escutcheon for the remote control unit of a television receiver to the baffle board thereof and for securing the microphone associated therewith within the escutcheon. In this latter application, the escutcheon consists of a face plate having a hollow shaft connected thereto, the latter being passed through an aperture in the baffle board, and the microphone is inserted and retained with the hollow shaft.

The present invention contemplates a simple one-piece spring clip fastener for both securing the escutcheon to the baffle board and for securing the microphone within the hollow shaft of the escutcheon.

It is therefore the principal object of this invention to provide a simple and inexpensive one-piece spring clip fastener which functions to secure one object within another object and to also secure itself to the latter object.

It is a further object of this invention to provide a simple and inexpensive one-piece spring clip fastener for securing one object within another object and for securing the latter object to a plate-like member.

It is a further object of this invention to provide a simple and inexpensive spring clip fastener which greatly reduces the time required to assemble one object within another object and to secure the latter object to a plate-like member.

These objects as well as the function of the invention will be readily apparent when the following specification is read in conjunction with the drawing, in which:

FIGS. 1, 2 and 3 are the front, side and end views, respectively, of the spring clip fastener of this invention; and FIG. 4 is a partial perspective view of the baffle board of a television receiver with the remote control unit's escutcheon mounted thereto by means of the spring clip fastener, and the microphone associated therewith secured within the hollow shaft of the escutcheon by the same fastener.

Referring now to the drawing, the spring clip fastener 10 (best seen in FIGS. 1, 2 and 3), which is preferably fabricated of spring steel, has a circular base 12 and a pair of arms 16 which extend upright from and substantially perpendicular to base 12. A J-shaped member 18 formed in the end of each of the arms 16 projects, at a substantially right-angle to arm 16, over the end of the shaft 33 of the escutcheon 30.

An aperture 13 is formed in base 12, with a number of tabs 14 projecting inward toward the center thereof. The innermost edges of tabs 14 form a circle having a diameter sufficiently smaller than shaft 33, so that tabs 14 frictionally grip, or "bite" into, shaft 33. Tabs 14 have a small amount of resiliency, since fastener 10 is fabricated of spring steel, and flex slightly when base 12 is forced down over shaft 33. In order to facilitate mounting fastener 10, shaft 33 is tapered towards its free end so as to be slightly smaller than the diameter of the circle formed by tabs 14.

In FIGS. 2 and 3, it may be noted that base 12 is bowed upward, or convex shaped. It is found that forming base 12 in this manner provides a much better gripping, or "biting," action of the tabs 14 with shaft 33 and that there is less tendency for tabs 14 to "walk" up shaft 33 when arms 14 are bent outward, particularly when the thickness of base 12 is made small. With this arrangement, that is, with base 12 convex shaped, the outer edge of base 12 is pressed tightly against the baffle board 36 and tabs 14 tend to hold base 12 in this position, since the forces exerted by tabs 14 are such that they tend to draw shaft 33 through the aperture 32 in baffle board 36.

As an alternate arrangement, shaft 33 could be formed with a stop groove or the like in its outer circumference for tabs 14 to engage. In this case, base 12 need not be convex shaped and could be flat. Base 12 could likewise be flat if the thickness of base 12 is sufficiently increased.

The microphone 35 is inserted in shaft 33 by bending arms 16 outward to allow it to pass between members 18 and into shaft 33. When released, arms 16 since they are resilient will spring back to their normal position, with members 18 extending over the end of shaft 33. Members 18 secure microphone 35 within the shaft 33, and the microphone can be removed only by bending arms 16 outward in the same fashion as when microphone 35 was inserted in shaft 33.

To further insure that microphone 35 is securely retained within shaft 33, a stop tab 20 is formed in each of the members 18. Stop tabs 20 extend downward, substantially perpendicular to the top of microphone 35, and aid in preventing the accidental removal of microphone 35. A small lip 37 may also be formed in the top edge of microphone 35 to further insure that microphone 35 is retained in shaft 33. Stop tabs 20 will engage lip 37 and will prevent removal of microphone 35.

The assembling of microphone 35 within hollow shaft 33 of escutcheon 30 and the latter to baffle board 36 is therefore easily accomplished by first extending hollow shaft 33 through aperture 32 in baffle board 36, pressing spring clip fastener 10 down over shaft 33 until face plate 31 is held tightly pressed against baffle board 36, and then spreading resilient arms 16 sufficiently to allow microphone 35 to pass between members 18 and into shaft 33. When resilient arms 16 are released they will restore to their normal position and secure microphone 35 within shaft 33.

In the case where the hollow tubular shaft is formed as an integral part of the television receiver cabinet, fastener 10 is pressed down over the end of the shaft and may or may not butt against the cabinet itself. In either case, tabs 14 grip, or "bite" into, the shaft in the manner previously described and fastener 10 is thereby secured to the shaft. The microphone also is inserted and retained in the shaft in the manner previously described.

While a specific use of the invention has been described, it is to be understood that it was so described only for purpose of illustration and not as a limitation. Other uses for the invention, as well as various modifications of the spring clip fastener, will be apparent to those skilled in the art. The invention, therefore, is intended to be limited only as it is defined in the appended claims.

The embodiments of the invention in which an exclusive property or privilege is claimed are defined as follows:

A spring clip for securing a device, including a tubular shaft having a shoulder at one end, to a wall defining an aperture for receiving said tubular shaft, and for additionally securing an object having a lip formed on one end, within said tubular shaft, said spring clip comprising; a convex base including a plurality of resilient tabs defining at their extension a circle of slightly smaller diameter than said tubular shaft, said plurality of resilient tabs frictionally engaging said tubular shaft and securing said device to said wall and said spring clip to said tubular shaft; and resilient upright arms connected to said base having bent ends extending over the other end of said tubular shaft and blocking entrance thereto, a stop tab formed in each of said bent ends, said stop tabs having free edges extending toward said base and adapted to engage said lip for securing said object within said shaft, said resilient arms being bendable to allow insertion of said object in said tubular shaft into abutting engagement with said shoulder at one end of said tubular shaft and retaining engagement with the free edges of said stop tabs at the other end of said hollow shaft, without disrupting the frictional engagement between said resilient tabs and said shaft.

References Cited by the Examiner

UNITED STATES PATENTS

| | | |
|---|---|---|
| 1,664,684 | 4/28 | Helgeby. |
| 1,865,131 | 6/32 | Olsen _____ 189—88 X |
| 2,103,743 | 12/37 | Doty. |
| 2,151,221 | 3/39 | Meeker _____ 189—88 |
| 2,303,148 | 11/42 | Tinnerman _____ 85—5 |
| 2,330,372 | 9/43 | Mittendorf _____ 151—41.75 |
| 2,375,728 | 5/45 | Cadwallader. |
| 2,388,650 | 11/45 | Whittell et al. _____ 339—75 |
| 2,912,769 | 11/59 | Kruger _____ 287—23 X |
| 2,928,065 | 3/60 | Hennessy et al. _____ 24—73 X |

FOREIGN PATENTS 821,706 10/59 Great Britain.

DONLEY J. STOCKING, *Primary Examiner.*